(12) United States Patent
Frank

(10) Patent No.: US 11,535,177 B2
(45) Date of Patent: Dec. 27, 2022

(54) DEVICE TO AESTHETICALLY COVER AND PROVIDE PROTECTION TO MOTORCYCLE VEHICLE IDENTIFICATION NUMBERS (VIN) AND/OR/COMBINATION EMISSION LABEL STICKER ON A MOTORCYCLE FRAME

(71) Applicant: John Joel Frank, Pleasant Hill, CA (US)

(72) Inventor: John Joel Frank, Pleasant Hill, CA (US)

(73) Assignee: John Joel Frank, Pleasant Hill, CA (US)

( * ) Notice: Subject to any disclaimer, the term of this patent is extended or adjusted under 35 U.S.C. 154(b) by 519 days.

(21) Appl. No.: 15/907,338

(22) Filed: Feb. 28, 2018

(65) Prior Publication Data

US 2019/0263334 A1     Aug. 29, 2019

(51) Int. Cl.
*B62J 50/28* (2020.01)
*B60R 13/10* (2006.01)
*B62J 99/00* (2020.01)
*B62J 50/25* (2020.01)

(52) U.S. Cl.
CPC ............. *B60R 13/105* (2013.01); *B62J 99/00* (2013.01); *B62J 50/25* (2020.02); *B62J 50/28* (2020.02)

(58) Field of Classification Search
USPC .................................................. 40/207, 210
See application file for complete search history.

(56) References Cited

U.S. PATENT DOCUMENTS

| 5,511,822 | A | * | 4/1996 | Wolanski | B62J 25/00 |
| | | | | | 150/167 |
| D405,032 | S | * | 2/1999 | Klarfeld | D12/110 |
| D423,415 | S | * | 4/2000 | McKay | D12/114 |
| 8,230,627 | B2 | * | 7/2012 | Soll | B62K 3/02 |
| | | | | | 280/288.4 |
| 2002/0112517 | A1 | * | 8/2002 | Akins | B21D 1/06 |
| | | | | | 72/75 |
| 2002/0139806 | A1 | * | 10/2002 | Mueller | B62J 23/00 |
| | | | | | 220/694 |
| 2003/0057729 | A1 | * | 3/2003 | Morris | B60R 13/04 |
| | | | | | 296/136.05 |
| 2010/0293826 | A1 | * | 11/2010 | Mottola | B60R 13/005 |
| | | | | | 40/590 |

\* cited by examiner

*Primary Examiner* — Kristina N Junge

(57) ABSTRACT

Device to aesthetically cover and provide protection to motorcycle vehicle identification numbers (vin) and/or emission label stickers on a motorcycle frame. Typically motorcycle frames will have a vin and/or/combination emission information sticker attached to them. Typically these stickers are required and cannot be removed. Besides the fact that these stickers are aesthetically displeasing, they are also exposed to the elements and debris of the road when riding. The device comprises of a removable semi cylindrical panel. The panel is secured to a motorcycle frame to cover and protect a vin and/or/combination emissions information label sticker.

8 Claims, 5 Drawing Sheets approximately 1/2 scale

DEVICE TO AESTHETICALLY COVER AND PROVIDE PROTECTION TO MOTORCYCLE VEHICLE IDENTIFICATION NUMBERS (VIN) AND/OR/COMBINATION EMISSION LABEL STICKER ON A MOTORCYCLE FRAME

BACKGROUND

This invention relates in general to motorcycle accessories and more specifically labels on motorcycle frames including vehicle identification number and/or/combination emissions label stickers. Typically motorcycle frames will have a vin and/or/combination emission information sticker attached to them. Typically these stickers are required and cannot be removed. In the motorcycle industry, motorcycle owners will commonly spend a significant amount of money to customize and improve the cosmetic look of their motorcycles. These stickers, affixed to the motorcycle frame, are generally in plain view for accessibility but create an aesthetically displeasing sight. In additional to the unfavorable cosmetic looks of these stickers, they are also exposed to the elements and debris of the road when riding. Harsh weather including hail and rain and/or debris such as rocks picked up off the road by the motorcycle's front tire or other automobiles on the road can cause chips and unwanted wear and tear to said sticker.

Several covering and concealing devices for vehicle identification numbers and license plates exist for use in the automotive industry for automobiles only. These devices for use with automobiles are known in the art and include U.S. Pat. No. 7,410,200 to Kirschener discloses A device for concealing the Vehicle Identification Number (VIN) plate/label of an automobile in the narrow space between the dashboard and the windshield of an automobile, the device comprising a panel, comprising a distal portion, tightly wedged between the dashboard and windshield of the automobile, a proximal portion with a handling means; and a series of impressed lines arrayed across one surface of the panel, allowing the panel to bend along the arc of the dashboard.

U.S. Pat. No. 6,594,926 to Wujciga discloses a decorative and durable vehicle license plate cover that is flat, thick, mar-resistant plate of optically transparent stable, such as acrylic plastic. The plate has a solid body with a front surface, a rear surface and sides interconnecting the two surfaces. Spaced holes are drilled on the perimeter of the front surface and extend to the rear surface for attaching the cover to a vehicle license plate.

U.S. Pub. No. 20040159023 to DeGroote discloses a license plate loover for preventing unauthorized photographing of the license plates. The loover structure uses solid non see-through slats that are horizontally across. The slats are similar to mini blinds. These slats cannot be seen through from above or from an abrupt angle and are made of a solid material but allow a clear view from straight on Bolts are used to install the loover on the license plate.

U.S. Pat. No. 4,956,930 to Troncoso, The license plate cover prevents viewing of the license plate identifying numbers and symbols from the sides of the plate, but does not prevent viewing thereof from directly in line with the plate. The cover includes a frame adapted to overlie the plate and defining a central opening through which the plate numbers can be seen. To the frame are connected a number of spaced vanes which project outwardly thereof and obscure side viewing of the plate numbers. For this purpose, it is preferred to have the vanes parallel with each other and running from the top to the bottom of the frame across the opening, and perpendicular to the main plane of the frame. The vanes can be opaque or transparent. In the latter case, the collective effect of side viewing through the array of vanes is to obscure such viewing. The vanes can be unitary and integral with the frame or pivotally connected thereto for moving between an open position and closed position, the latter overlying the plate identification indicia, to protect the plate under special circumstances. The cover can include a slide bar to move the vanes, retainers to hold the vanes in open and closed positions and one or more spring-biased clips or the like to releasably connect the cover over the license plate. The sides of the vanes can bear symbols and the like for decorative and other purposes.

These listed vin covers, license plate covers, and concealing devices differ from use of the art relating to type of motor vehicle (i.e. automobile dash vin plate versus motorcycle frame vin and/or/combination emissions label sticker), locations and composition of vehicle identification number (vin) differ, do not apply to the application of a combination vin and emissions sticker label, which are typically separate on an automobile in different locations on the vehicle, and listed device designs greatly differ from the current invention. No device could be found in the arts for cosmetically concealing and protecting vin and/or/combination emissions stickers found on motorcycle frames.

SUMMARY

The present invention is a device for concealing and protecting the vin and/or/combination emissions label stickers. Typically a vin label or sticker for a motorcycle is combined with emission related information and fixed to the down tube of a motorcycle frame. The vin and emissions label can also be independent of each other on opposing down tubes of a motorcycle frame. In this case, the present invention can be used multiple times on the same respective motorcycle frame to cover multiple vin and or emissions stickers when applicable. The present invention is comprised of a semi cylindrical shaped cover that is designed for relatively fast removal and installation on motorcycle frame when inspection of vin and/or/combination label is required. Depending on manufacturer and model of motorcycle, the frame diameter which typically said motorcycle vin and/or/combination label sticker is affixed too can vary in size. The length and inside diameter of the present invention's semi cylindrical (arch shaped) cover can vary depending on application of motorcycle frame manufacture and model. The cover will have a method of attachment to secure the cover to the motorcycle frame. The most common means of attachment will be magnets fixed to the inside of the cover with adhesive. The magnets have a thin layer of felt tape adhered to the magnet side facing the vin and/or/combination label sticker. The felt tape will act as a protective layer for the magnet to maintain integrity of sticker face with installation/removal operation. The cover will have a protective coated finish. To install the present invention, the applier will first determine orientation of cover relative to the motorcycle frame containing the vin and/or/combination emissions label and press inward toward the frame and secure. In the most common case of magnetic adhesion of cover to frame, once orientation is found of cover, having forward movement of cover to the ferrous motorcycle frame will create the bond to secure cover. Depending on application and composition of motorcycle frame, installing the present invention of a semi cylindrical concealing protective cover may be secured by other means including cable ties and molded clips.

FIGURES—REFERENCE NUMERALS

Figure 1:
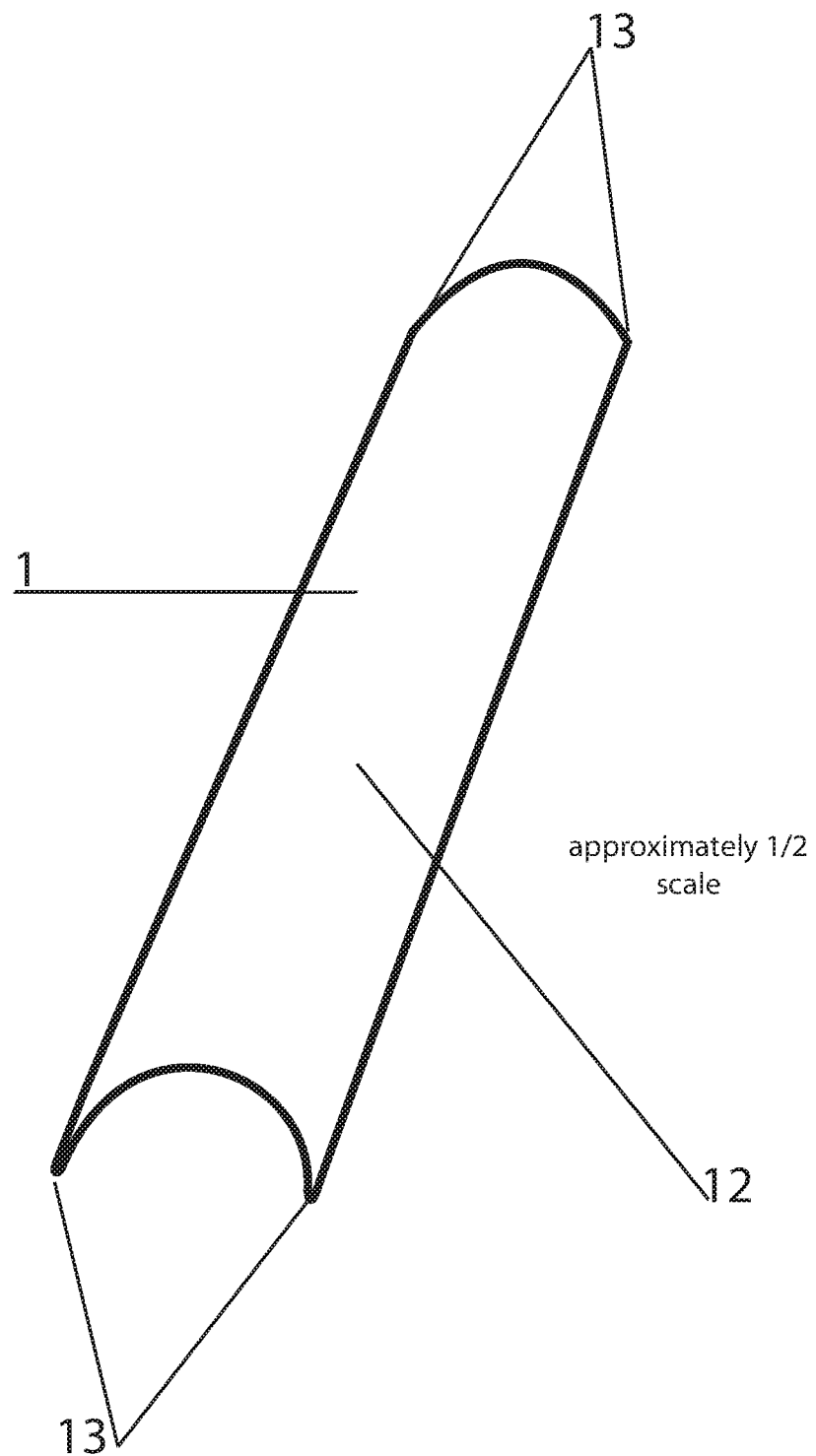
FIG. 1 is a plan view of the outward or top side of the panel in accordance with the present invention.

1. . . . Front outward side of current invention 2. . . . Back inward side of current invention 3. . . . Magnets 4. . . . Back inward side of current invention 5. . . . Magnets 6. . . . Felt tape 7. . . . Front half of a motorcycle frame 8. . . . Emission and/or/combination label sticker affixed to motorcycle frame 9. . . . Current invention 10. . . . Front half of a motorcycle frame 11. . . . Current invention installed on motorcycle frame concealing and protecting label 13. . . . edges of panel 14. . . . Adhesive for bonding magnets to inside of panel

DETAILED DESCRIPTION

Figure 2:
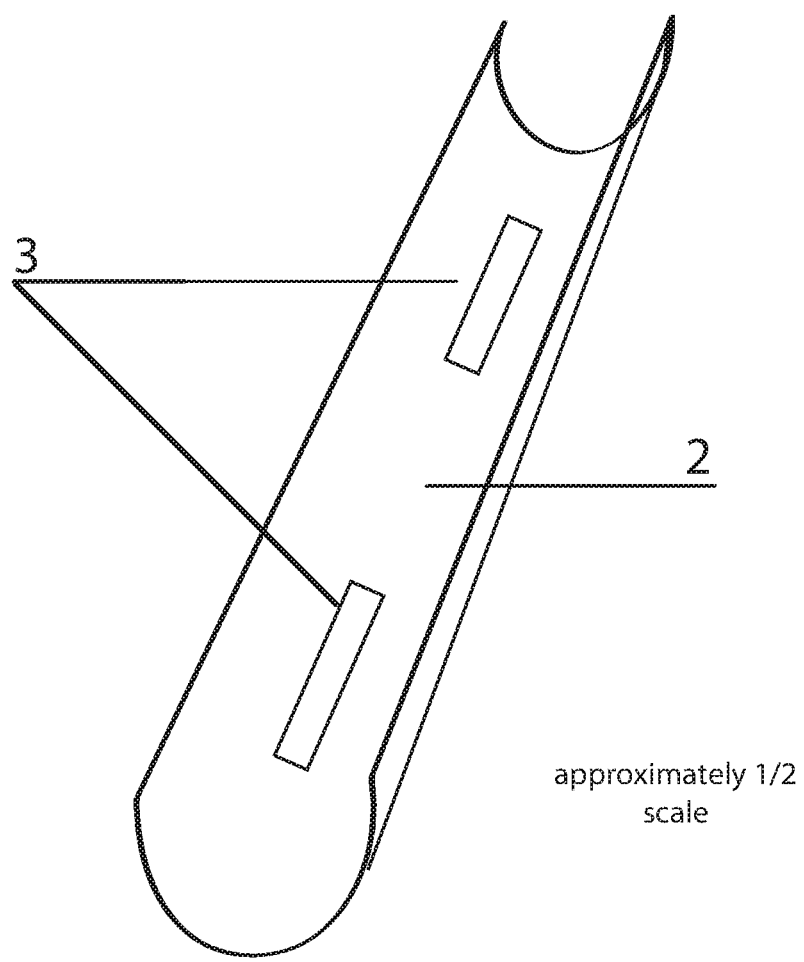
FIG. 2 is a plan view of the inward or bottom side of the panel in accordance with the present invention.
Figure 3:
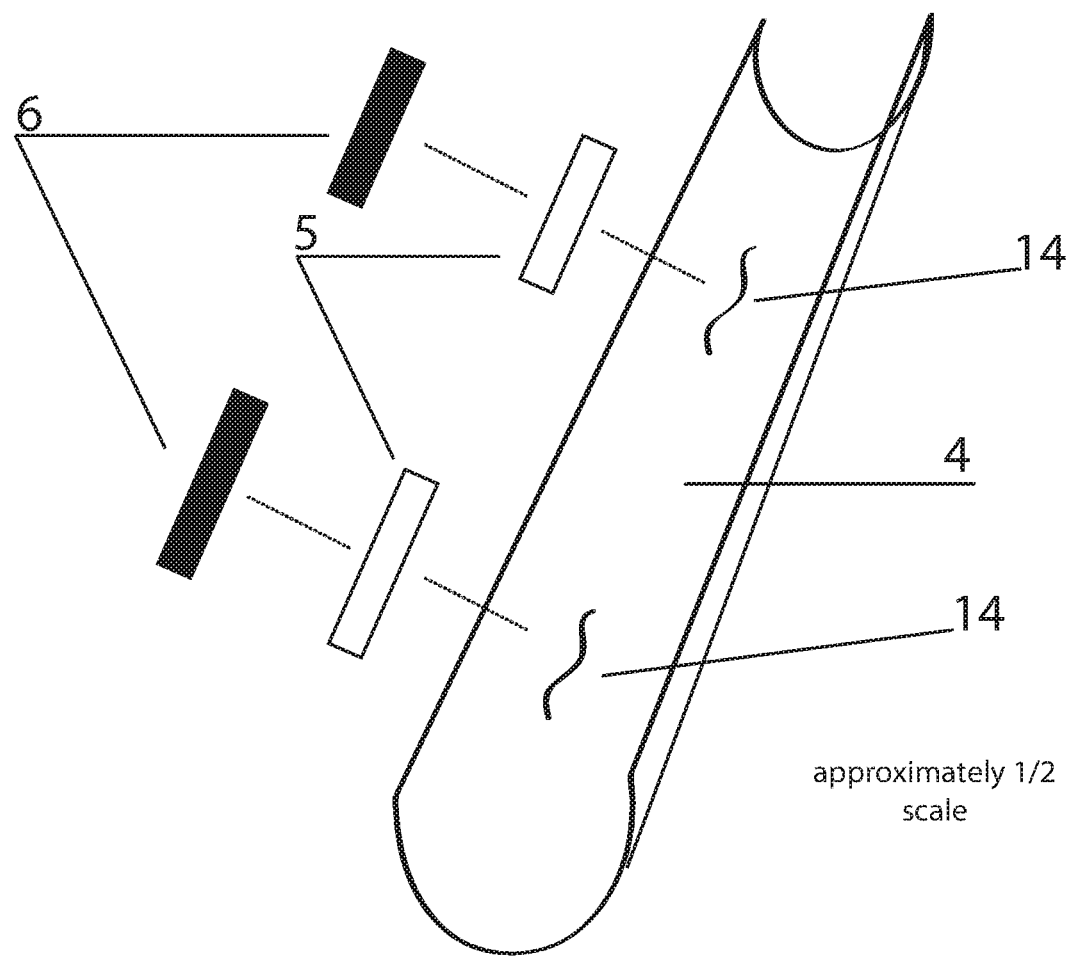
FIG. 3 is an exploded view of inward or bottom side of panel.
Figure 4:
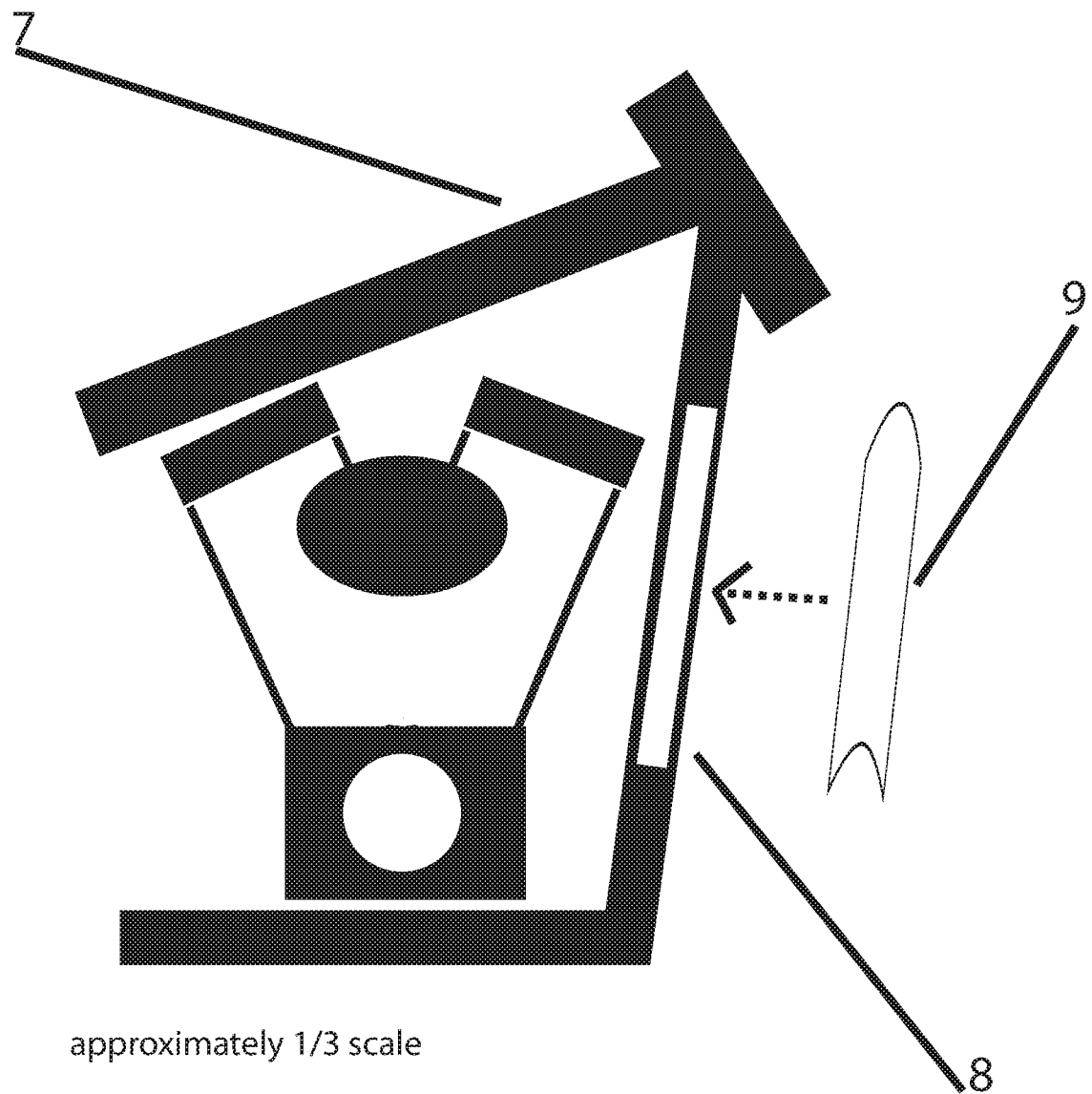
FIG. 4 is a side perspective view of the front half portion of a motorcycle frame with the vin and/or/combination emission label sticker affixed to the down tube where commonly found. The figure also includes a perspective view of current invention next to frame showing installation motion.
Figure 5:
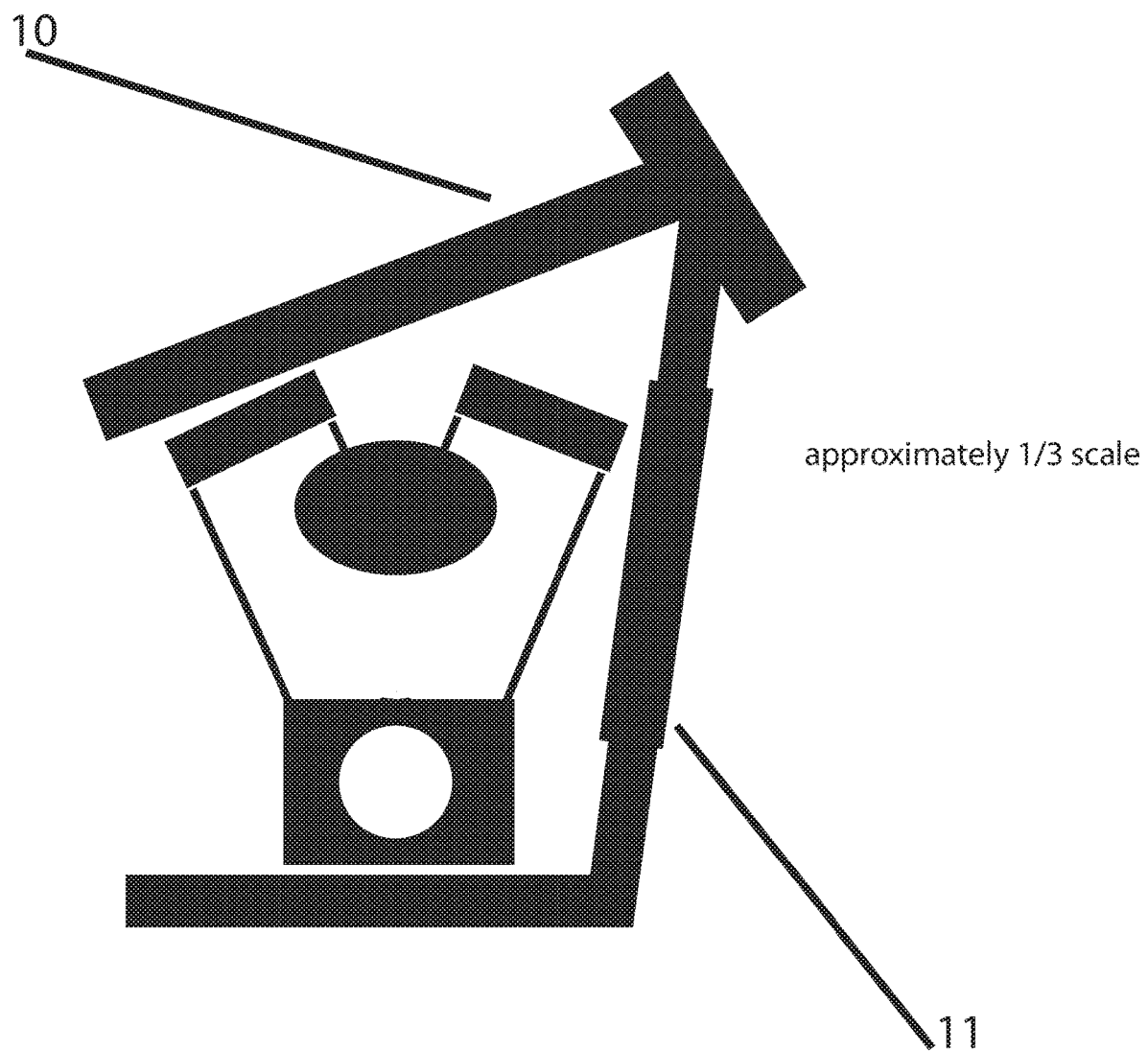
FIG. 5 is a side perspective of the front half portion of a motorcycle frame with current invention installed on frame down tube concealing and protecting vin and/or/combination emissions label.

Referring to the drawings, a preferred embodiment of a device for concealing and protecting the Vehicle Identification Number (VIN) and/or/emissions label stickers on a motorcycle frame is illustrated as 1 in FIG. 1, but also includes various perspectives of current invention shown in 2 in FIG. 2, 4 in FIG. 3, 9 in FIG. 4, 11 in FIG. 5. Still referring to FIG. 1, 1 depicts front outward facing view of current invention including semi cylindrical shape body. The panel can have rounded or squared edges depicted in 13. The cover panel 1 will have a powder coat finish to protect panel surface from the outside elements and road debris 12. Variations of length and inside diameter of the semi cylindrical (arch) shaped cover 1 differ based on application of manufacturer and model motorcycle frame. The scale in FIG. 1 is approximately ½.

Referring to FIG. 2, the back inward side of panel 2 will have a means to secure the panel to motorcycle frame. The most commonly used method for this will be two magnets 3 bonded to backside of panel 2. There can also be variations to how panel is fixed to motorcycle frame including bonded molded clips or zip ties affixed at the same location. The scale in FIG. 2 is approximately ½.

Referring to FIG. 3, depicts exploded view of current invention. The current invention consisting of cover plate 4, comprised of mild steel or formed plastic, adhesive to bond magnets to cover 14, magnets to secure panel to ferrous motorcycle frame 5, and felt tape 6 that protects label on frame from outward facing magnet surface.

Referring to FIG. 4, Motorcycle frame designs 7 vary based on manufacturer and model. Typically a motorcycle frame consists of round tubing bent to make up areas of frame. Typically motorcycle frames 7 will have a vin and/or/combination emissions label sticker 8 affixed to them in plain view for inspection and accessibility but create an aesthetically displeasing sight. Typically these stickers 8 cannot be removed from frame 7. The current invention 9 is installed by first determining orientation of cover relative to the motorcycle frame 7 containing the vin and/or/combination emissions label 7 and press inward 9 toward the frame and secure. The scale in FIG. 4 is approximately ⅓.

Referring to FIG. 5, the present invention 11 is a device for concealing and protecting the vin and/or/combination emissions stickers on motorcycle frames 10. Relating to FIG. 5, depicts device 11 installed on motorcycle frame 10 and covering the vin and/or/combination emissions label previously depicted in FIG. 4 8. The current invention cover 11 will not only be coated a specific color to match and blend to the manufacturer and model factory finish of frame to minimize visually displeasing appearance of label but also protect against exposure to weathering elements and debris of the road when riding. Harsh weather including hail and rain and/or debris such as rocks picked up off the road by the motorcycle's front tire or other automobiles on the road can cause chips and unwanted wear and tear to said sticker.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An apparatus for protecting a vehicle identification number label on a motorcycle, comprising:
   a semi-cylindrical cover of a semi flexible material, said cover shaped and sized to affix to a motorcycle frame and comprising an inner concave surface, an outer convex surface, and first and second edges distal from one another;
   at least one magnet attached to said inner surface of said cover, said at least one magnet comprising an exterior surface;
   felt covering said exterior surface of said at least one magnet, said felt preventing scratching of a surface of the motorcycle;
   said outer convex surface of said cover having a protective powder coat finish;
   wherein said cover is configured to flex upon installation over a motorcycle frame member;
   wherein said cover covers and protects a vehicle identification number and/or emission sticker located on a downtube of a motorcycle frame.

2. The apparatus of claim 1, wherein the edges are rounded.

3. The apparatus of claim 1, wherein the edges are square.

4. The apparatus of claim 1, wherein the material of the cover is selected from steel and plastic.

5. The apparatus of claim 1, wherein the magnets are attached to the inner surface by adhesive.

6. The apparatus of claim 1, wherein the cover is removable.

7. The apparatus of claim 1, wherein the at least one magnet comprises a plurality of magnets.

8. The apparatus of claim 1, wherein the powder coat finish comprises a color finish which complements an exterior color of said motorcycle.

\* \* \* \* \*